United States Patent
Hirose et al.

(10) Patent No.: US 11,772,285 B2
(45) Date of Patent: Oct. 3, 2023

(54) MALFUNCTION DETECTION DEVICE AND MALFUNCTION DETECTION METHOD

(71) Applicant: Nissan Motor Co., Ltd., Kanagawa (JP)

(72) Inventors: Satoru Hirose, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 549 days.

(21) Appl. No.: 16/975,960

(22) PCT Filed: Feb. 28, 2018

(86) PCT No.: PCT/JP2018/007513
§ 371 (c)(1),
(2) Date: Aug. 26, 2020

(87) PCT Pub. No.: WO2019/167170
PCT Pub. Date: Sep. 6, 2019

(65) Prior Publication Data
US 2020/0398447 A1    Dec. 24, 2020

(51) Int. Cl.
*B25J 19/06* (2006.01)
*B25J 19/02* (2006.01)
*G01P 15/097* (2006.01)

(52) U.S. Cl.
CPC .............. *B25J 19/06* (2013.01); *B25J 19/02* (2013.01); *G01P 15/097* (2013.01)

(58) Field of Classification Search
CPC ...... H02P 29/024; G01P 15/097; G01P 15/00; B25J 9/1674; B25J 19/06; B25J 19/02; G01M 99/005; G05B 2219/42256; G05B 2219/37435; G05B 2219/37209
See application file for complete search history.

(56) References Cited

U.S. PATENT DOCUMENTS

| | | | |
|---|---|---|---|
| 6,249,496 B1 * | 6/2001 | Tsukahara | G11B 7/0941 |
| 10,401,329 B2 | 9/2019 | Kajita et al. | |
| 11,565,421 B2 * | 1/2023 | Suyama | B25J 9/046 |
| 11,602,863 B2 * | 3/2023 | Naitou | G01M 1/122 |

(Continued)

FOREIGN PATENT DOCUMENTS

| | | |
|---|---|---|
| CN | 106662505 A | 5/2017 |
| EP | 3193153 A1 | 7/2017 |

(Continued)

OTHER PUBLICATIONS

Siddiqui et al., dsPIC-based advanced data acquisition system for Monitoring, Control and Security Applications, 2015, IEEE, p. 293-298 (Year: 2015).*

(Continued)

*Primary Examiner* — Marc McDieunel
(74) *Attorney, Agent, or Firm* — Osha Bergman Watanabe & Burton LLP

(57) ABSTRACT

A control unit causes a sensor to start sampling at a plurality of start timings different from each other. The control unit combines sampling signals obtained by the start of the sampling at the different start timings, and detects a malfunction of an apparatus in accordance with the combined sampling signal.

12 Claims, 7 Drawing Sheets

(56) References Cited

U.S. PATENT DOCUMENTS

2017/0212085 A1 7/2017 Kajita et al.
2020/0406483 A1* 12/2020 Hirose ............... G01M 13/005

FOREIGN PATENT DOCUMENTS

JP        2017-63952 A    4/2017
WO    2007/008940 A2    1/2007

OTHER PUBLICATIONS

Scaradozzi et al., Monitoring groundwater characteristics by means of a multi-parametric probe and sampling device, 2009, IEEE, p. 50-57 (Year: 2009).*

Jiménez et al., FPGA-based implementation of a real-time timing measuring device, 2013, IEEE, p. 1-4 (Year: 2013).*

Abba et al., Design and test equipment of digital processors for output analysis from radiation detectors, 2011, IEEE, p. 889-893 (Year: 2011).*

Xiaohui et al.; "Research on High-Speed Data Acquisition System Based on Equivalent Time Sampling Principle"; Radio Engineering, No. 29, Issue 4; Mar. 1999 (8 pages).

Xiaowei et al. "Design of High-speed High-Precision Data Acquisition System Based on FPGA" Instrument Technique and Sensor, No. 1; Jan. 2016 (18 pages).

* cited by examiner

MALFUNCTION DETECTION DEVICE AND MALFUNCTION DETECTION METHOD

TECHNICAL FIELD

The present invention relates to a malfunction detection device and a malfunction detection method.

BACKGROUND ART

A technique is known that samples and detects vibration amplitude by an accelerometer.

CITATION LIST

Patent Literature

Patent Document 1: Japanese Unexamined Patent Application Publication No. 2017-63952

SUMMARY OF INVENTION

Technical Problem

A sensor such as an accelerometer samples an apparatus at a predetermined sampling frequency to output a sampling signal. A malfunction of the apparatus cannot be detected if the malfunction appears in a high frequency band higher than the sampling frequency.

In view of the foregoing problem, the present invention provides a malfunction detection device and a malfunction detection method capable of detecting a malfunction of an apparatus in a high frequency band higher than a sampling frequency of a sensor.

Technical Solution

A malfunction detection device according to an aspect of the present invention causes a sensor for detecting a state of an apparatus to start sampling at a plurality of start timings different from each other. The malfunction detection device combines sampling signals, and detects a malfunction of the apparatus in accordance with the combined sampling signal.

Advantageous Effects

The present invention can detect a malfunction of the apparatus in a high frequency band higher than a sampling frequency of the sensor.

DESCRIPTION OF EMBODIMENTS

Figure 1:
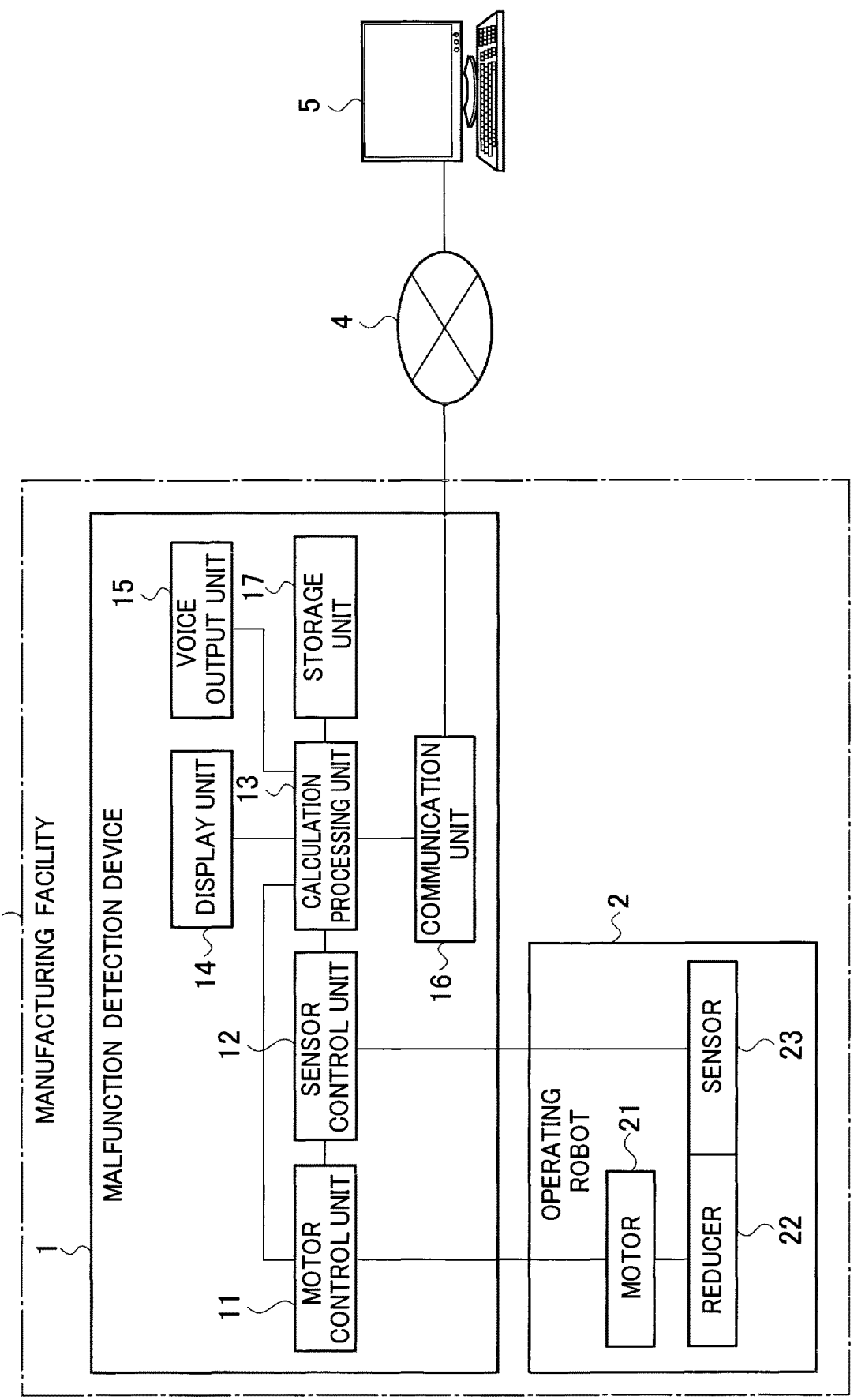
FIG. 1 is a diagram illustrating a configuration of a system including a malfunction detection device according to an embodiment.

An embodiment will be described below with reference to the drawings. The same elements illustrated in the drawings are indicated by the same reference numerals, and overlapping explanations are not made below.

FIG. 1 is a diagram illustrating a system including a malfunction detection device according to the embodiment.

The malfunction detection device 1 is a device for determining whether an apparatus has a malfunction, for example, determining whether an operating robot 2 (apparatus) of a multi-axis machine for assembling a vehicle has a malfunction. The malfunction detection device 1 and the operating robot 2 are installed in a manufacturing facility 3, while the malfunction detection device 1 is connected to a computer 5 via a communication line 4.

The operating robot 2 is an apparatus including a rotating mechanism (such as a motor; hereinafter referred to as a motor 21) and a mechanism (such as a reducer; hereinafter referred to as a reducer 22) for exchanging a torque of the motor 21 to a higher torque to move an object with a heavy load by an arm of the operation robot 2, for example. The operating robot 2 repeats a predetermined operation A necessary for assembling a vehicle. The motor 21 starts operating when receiving an operation start signal 100 for causing the motor 21 to start the operation.

A sensor 23 for detecting an acceleration of a part adjacent to the reducer 22 so as to serve as a vibration sensor for detecting vibrations of the part is arranged adjacent to the reducer 22. The sensor 23 generates a waveform indicating the acceleration in association with the vibrations at the arranged part of the sensor 23, namely, a waveform indicating a state of the operating robot 2, and samples the waveform at a predetermined sampling cycle t to output a sampling signal M1. The sensor 23 is not limited to the sensor for detecting the acceleration, and may be a sensor for detecting a velocity and a displacement of the arranged part so as to detect a magnitude of vibrations. Various types of sensors capable of acquiring a change in attitude in a time-series manner may be used, such as a piezoelectric sensor, an angular velocity sensor, and a gyrosensor.

The sensor 23 may be an element which generates a waveform of vibrations to sample the waveform as described above, or may be an element which samples a waveform of vibrations generated by another sensor to output a detection value detected during the sampling.

In particular, the sensor 23 starts sampling at a start timing when receiving a sampling start signal 200. The sensor 23 first executes the sampling during a predetermined sampling period (hereinafter referred to simply as a sampling period). In particular, the sensor 23 executes the sampling (detects a value of a waveform) on the sampling cycle t during the sampling period. The sensor 23 repeats the sampling several times during the sampling period. The first sampling is executed upon the reception of the sampling start signal 200. The sensor 23 sequentially outputs the value of the waveform detected (the detection value) as the sampling signal M1 during the sampling period. The detection values are collectively referred to as the sampling signal M1.

Figure 2:
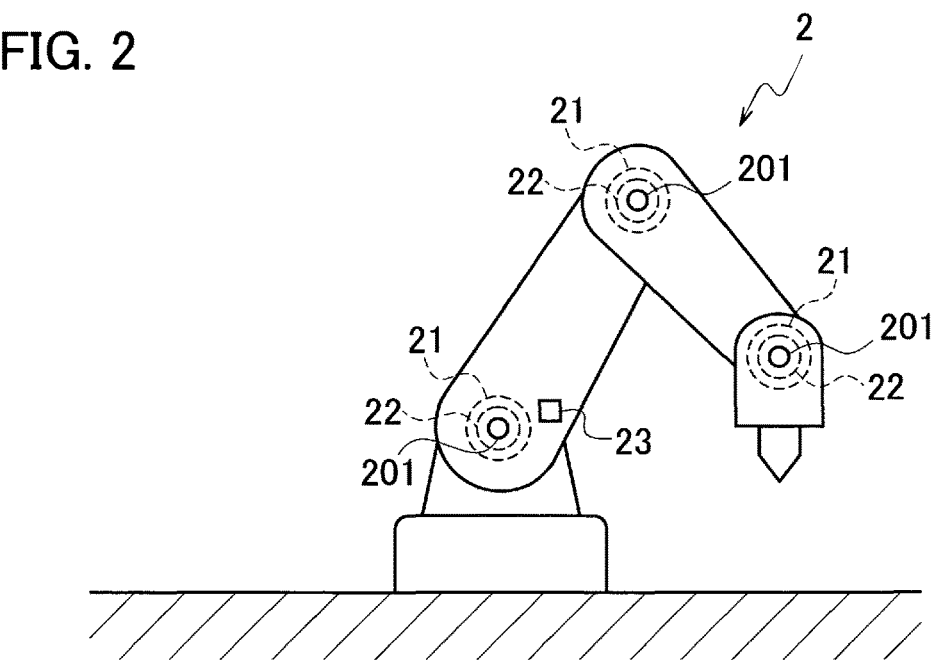
FIG. 2 is a diagram illustrating an arrangement example of a sensor 23 in an operating robot 2.

FIG. 2 is a diagram illustrating an arrangement example of the sensor 23 in the operating robot 2.

The operating robot 2 includes three rotating shafts 201, for example, each being provided with the motor 21 and the reducer 22. The sensor 23 is arranged adjacent to the reducer 22 provided in one of the rotating shafts 201, for example. The sensor 23 is arranged adjacent to the reducer 22, which is not easy to replace as compared with the motor 21, so that the sensor 23 can detect a malfunction of the reducer 22 at an early stage.

The explanations are further made below while returning to FIG. 1.

The malfunction detection device 1 includes a motor control unit 11, a sensor control unit 12, a calculation processing unit 13, a display unit 14, a voice output unit 15, a communication unit 16, and a storage unit 17.

The malfunction detection device 1 includes a general-purpose microcomputer (referred to also as a control unit) including a central processing unit (CPU), a memory, and an input-output unit. A computer program (a malfunction detection program) is installed on the microcomputer so as to function as the malfunction detection device. The microcomputer functions as a plurality of information processing circuits (11 to 13 and 16) included in the malfunction detection device when the computer program is executed. While the embodiment is illustrated with the case in which the software is installed to fabricate the information processing circuits (11 to 13 and 16) included in the malfunction detection device, dedicated hardware for executing each information processing as described below can be prepared to compose the information processing circuits (11 to 13 and 16). The respective information processing circuits (11 to 13 and 16) may be composed of individual hardware.

The motor control unit 11 outputs the operation start signal 100 to the motor 21 and the sensor control unit 12 when starting each operation A. The output of the operation start signal 100 causes the motor 21 to start operating to further cause the reducer 22 to operate in association with the operation of the motor 21. The operation of each of the motor 21 and the reducer 22 leads the operation A to be executed. The motor control unit 11 stores and outputs a magnitude, a time, and a timing of a current flowing through the motor 21 so as to control the motor 21 to cause the operating robot to perform a predetermined action, and further outputs each of the pieces of information to the sensor control unit 12 and the calculation processing unit 13.

The sensor control unit 12 sends the sampling start signal 200 at the reception time of receiving the operation start signal 100 to the sensor 23 so as to cause the sensor 23 to detect the acceleration. The sensor control unit 12 then receives the sampling signal M1 from the sensor 23 during the operation of the reducer 22, and transfers the signal to the calculation processing unit 13. The sampling signal M1 per operation A repeatedly executed is referred to as a sampling signal M11 for illustration purposes. The sensor control unit 12 herein can be referred to as a signal input unit to which the sampling signal M1 obtained when the state of the apparatus (2) detected by the sensor 23 is sampled is input.

The sensor control unit 12 also sends the sampling start signal 200 to the sensor 23 when the time Δ has passed since the reception of the operation start signal 100 in the subsequent operation A, receives the sampling signal M1 from the sensor 23, and transfers the signal to the calculation processing unit 13. This sampling signal M1 is referred to as a sampling signal M12 for illustration purposes.

The time Δ is shorter than the sampling cycle t, and is preliminarily stored in the sensor control unit 12. The calculation processing unit 13 also preliminarily stores the time Δ.

The sensor control unit 12 transfers the sampling signal M11 to the calculation processing unit 13 in the subsequent operation A, as in the case of the sampling signal M11 described above.

The sensor control unit 12 also transfers the sampling signal M12 to the calculation processing unit 13 in the subsequent operation A, as in the case of the sampling signal M12 described above.

The sensor control unit 12 repeats the transfer of the sampling signals M11 and M12.

The contents of the operation A vary depending on the type of the operation A (the operation type), and the sampling signals M11 and M12 of different operation types may be mixed together and transferred to the calculation processing unit 13. The following explanations are made while presuming the case in which the sampling signals M of different operation types are mixed together.

The calculation processing unit 13 receives the sampling signals M11 and M12, and combines the sampling signals M11 and M12 of the same operation type. The calculation processing unit 13 calculates frequency characteristics f11 and f12 respectively from the sampling signals M11 and M12 through fast Fourier transform (FFT), and calculates frequency characteristics f1 of the combined sampling signal T1. The calculation processing unit 13 further detects a malfunction of the operating robot 2 according to the frequency characteristics f1. The frequency characteristics are also referred to as a power spectrum.

The display unit 14 displays the sampling signals M11 and M12, the frequency characteristics f11 and f12, the frequency characteristics f1, and the result of determination of whether the operating robot 2 has a malfunction (hereinafter, collectively referred to as a measurement result 140) in real time, and is a liquid crystal monitor, for example. The display unit 14 displays the measurement result 140 regardless of whether the operating robot 2 has a malfunction.

The voice output unit 15 notifies an operator of a malfunction with an alarm sound or vibrations when the operating robot 2 is determined to have a malfunction, and is a speaker, for example.

The communication unit 16 sends the measurement result 140 to the computer 5 located in a remote place (the outside), and is a router in a wired LAN or a wireless (Wi-Fi) router, for example.

The storage unit 17 stores the received sampling signals M11 and M12 and the reception time of the sampling signals M11 and M12. The storage unit 17 includes a normal model preliminarily generated according to the frequency characteristics acquired when the operating robot 2 is in a normal state. The normal model includes a threshold used when determining whether the operating robot 2 is in the normal state.

The computer 5 is used by an observing person or a maintenance person who observes the operating robot 2 in the remote place, and receives and displays the measurement result 140 to notify the observing person and the like of a malfunction with an image, sound or voice, or vibrations.

Figure 3:
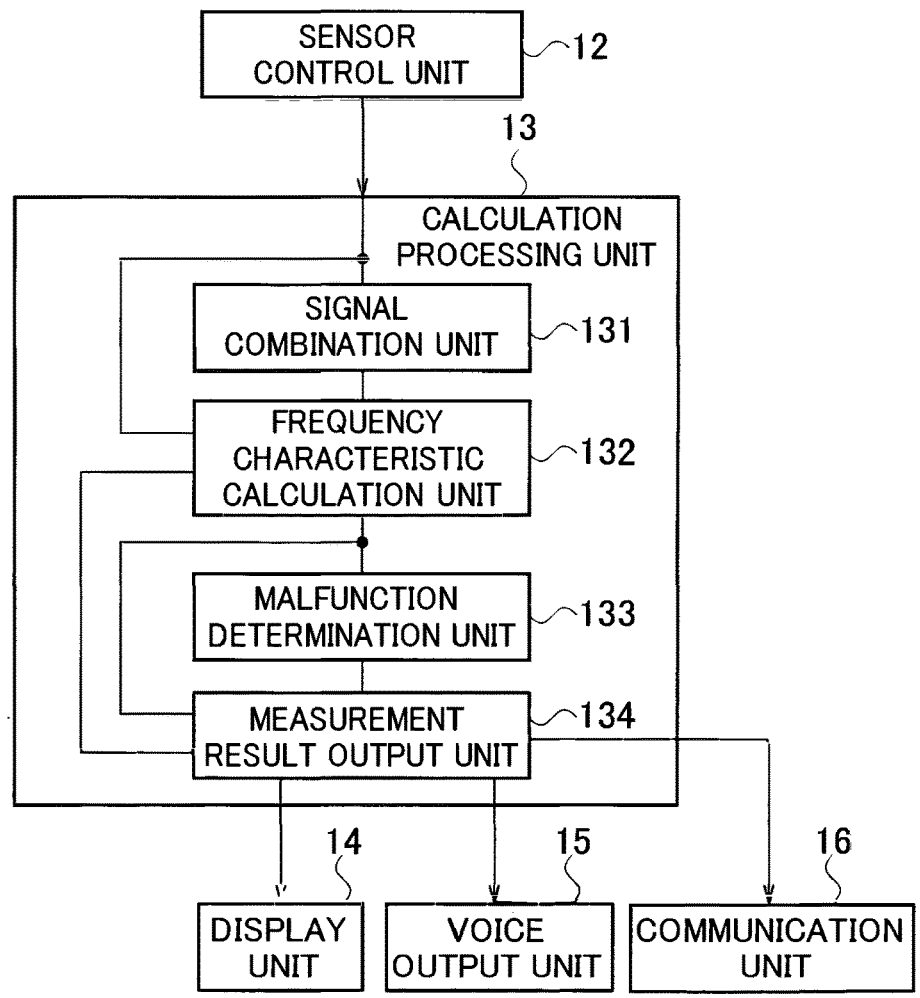
FIG. 3 is a block diagram illustrating a schematic configuration of a calculation processing unit 13.

FIG. 3 is a block diagram illustrating a schematic configuration of the calculation processing unit 13.

The calculation processing unit 13 includes a signal combination unit 131, a frequency characteristic calculation unit 132, a malfunction determination unit 133, and a measurement result output unit 134.

The signal combination unit 131 receives the sampling signals M11 and M12, and combines the sampling signals M11 and M12 of the same operation type so as to generate the sampling signal T1.

The frequency characteristic calculation unit 132 calculates the frequency characteristics f11 and f12 respectively based on the sampling signals M11 and M12 to calculate the frequency characteristics f1 of the combined sampling signal T1.

The malfunction determination unit 133 determines whether the operating robot 2 has a malfunction in accordance with the frequency characteristics f1. The malfunction determination unit 133 more particularly determines whether the operating robot 2 has a malfunction in accordance with the frequency characteristics f1 and the normal model.

The measurement result output unit 134 displays the measurement result 140 on the display unit 14. The measurement result output unit 134 causes the voice output unit 15 to produce an alarm sound or vibrations when the operating robot 2 is determined to have a malfunction. The measurement result output unit 134 outputs the measurement result 140 to the communication unit 16.

Figure 4:
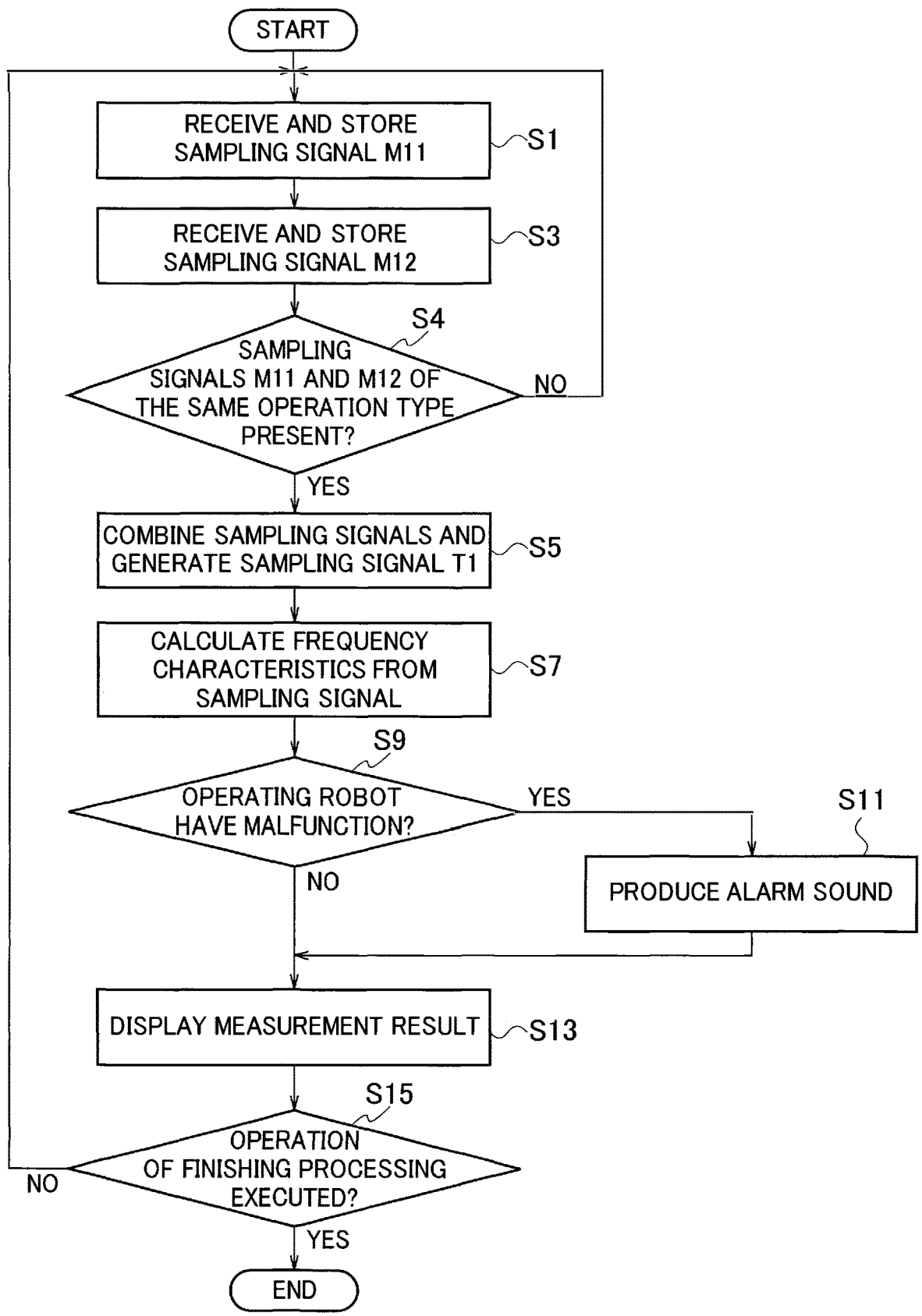
FIG. 4 is a flowchart showing a process performed by the calculation processing unit 13.

FIG. 4 is a flowchart illustrating a process performed by the calculation processing unit 13.

The signal combination unit 131 first receives the sampling signals M11 and M12 to store the signals in the storage unit 17 (S1 and S3). The reception time of the operation start signal 100 corresponding to the sampling signal M11 (hereinafter referred to as the reception time t11) and the reception time of the operation start signal 100 corresponding to the sampling signal M12 (hereinafter referred to as the reception time t12) are also stored in the storage unit 17.

When the operating robot 2 is determined to have a malfunction in the latter determination described below, the normal model and the threshold can be updated in accordance with the sampling signals stored in the storage unit 17.

Figure 5:
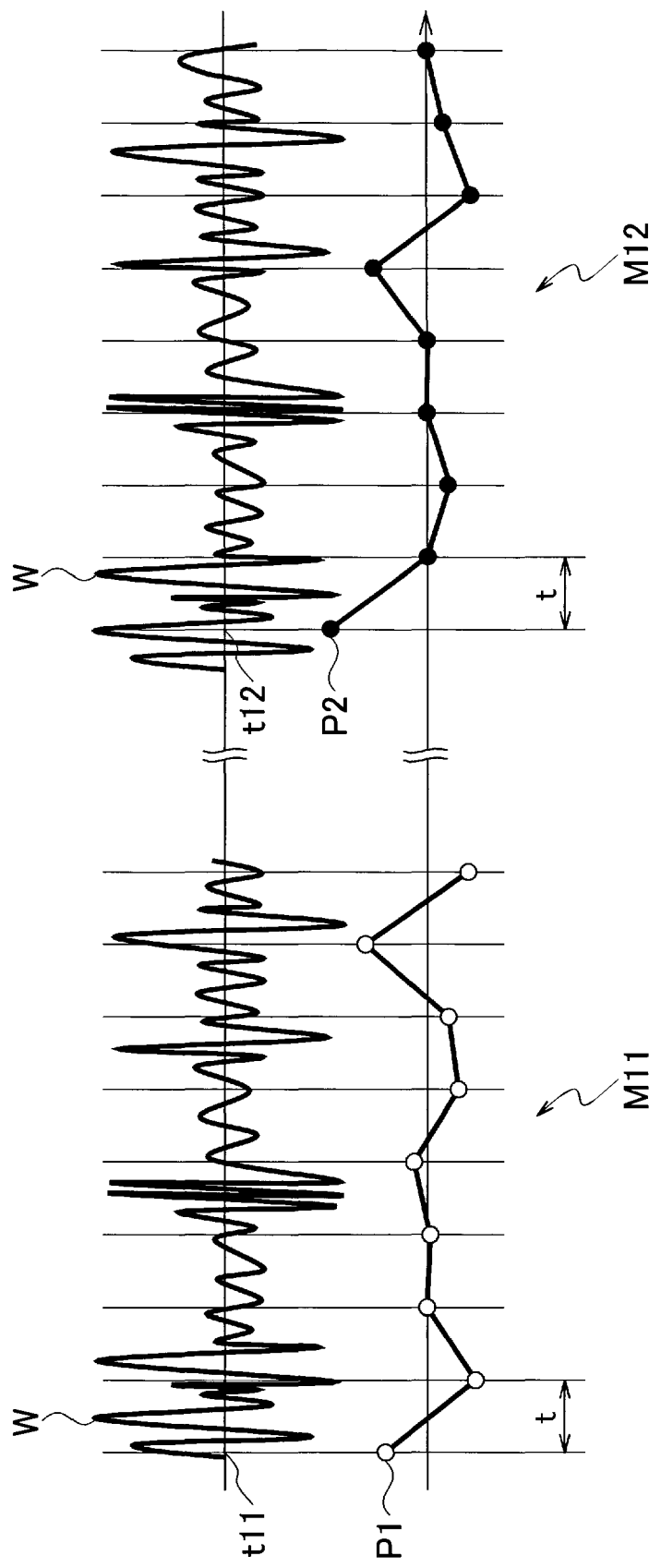
FIG. 5 is a diagram illustrating examples of waveforms indicating sampling signals M11 and M12 of the same operation type and a state of an apparatus.

FIG. 5 is a diagram illustrating the sampling signals M11 and M12 of the same operation type and examples of original waveforms.

The sensor 23 starts the sampling of the waveform W indicating the magnitude of the acceleration in association with the vibrations at the arranged part of the sensor 23 at the time when receiving the sampling start signal 200 (at the reception time t11). Namely, the sensor 23 starts the sampling on the sampling cycle t. The sensor 23 sequentially outputs the detection value P1 as the sampling signal M11. As described above, the sensor 23 used may be a sensor for detecting a velocity and a displacement of the arranged part so as to detect the magnitude of the vibrations.

The sensor 23 also starts the subsequent sampling at the time when receiving the next sampling start signal 200 (at the reception time t12). Namely, the sensor 23 starts the sampling on the sampling cycle t. The sensor 23 sequentially outputs the detection value P2 as the sampling signal M12.

The sampling cycle of acquiring the sampling signal M11 and the sampling cycle of acquiring the sampling signal M12 are not necessarily strictly the same, and may include a margin of error. The respective sampling cycles including a margin of error thus can be presumed to be substantially the same. The respective sampling cycles upon the sampling are only required to be substantially the same.

The explanations are further made below while returning to FIG. 4.

The calculation processing unit 13 determines whether the sampling signals M11 and M12 of the same operation type are present in the storage unit 17 (S4), and the process returns to step S1 when the sampling signals M11 and M12 of the same operation type are not present in the storage unit 17 (S4: NO).

The process proceeds to step S5 when the sampling signals M11 and M12 of the same operation type are present in the storage unit 17 (S4: YES).

In step S5, the signal combination unit 131 chooses the sampling signals M11 and M12 of the same operation type. One of the sampling signals, M12, is defined as a sampling signal acquired at the start timing of the sampling started after the time Δ has passed (hereinafter referred to as a sampling signal M12A). The signal combination unit 131 combines the other sampling signal M11 with the sampling signal M12A so as to generate the sampling signal T1 (the combined sampling signal) (S5).

Figure 6:
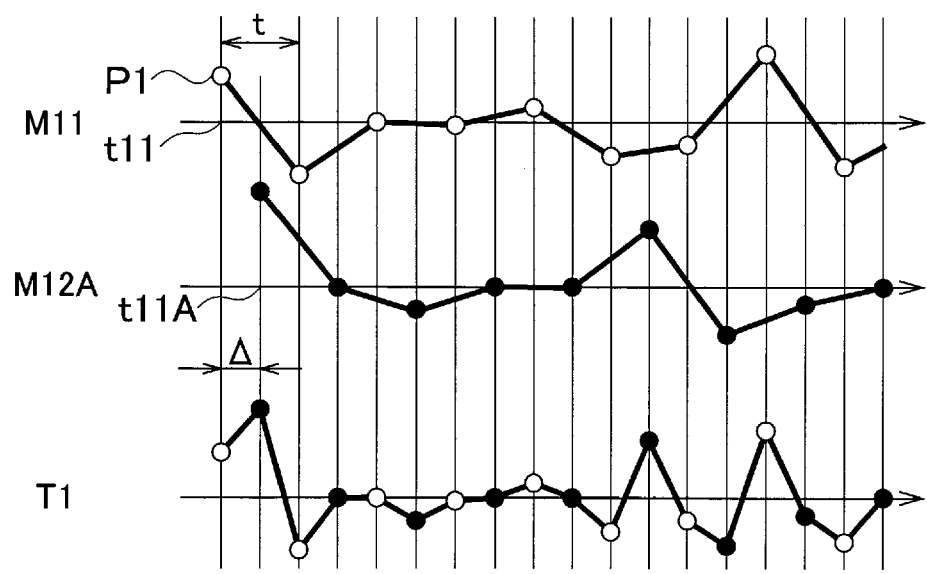
FIG. 6 is a diagram illustrating examples of sampling signals M11, M12A, and T1.

FIG. 6 is a diagram illustrating the examples of the respective sampling signals M11, M12A, and T1.

The sampling signal M11 is an aggregate of the detection values P1 starting from the detection value P1 detected at the reception time t11. The sampling signal M12A is an aggregate of the detection values P2 starting from the detection value P2 detected at the time t11A after the time Δ has passed since the reception time t11.

The time of each sampling (the sampling timing) of the sampling signal M12A is behind by the time Δ (shorter than the sampling cycle t) from the time of each sampling (the sampling timing) of the sampling signal M11. Namely, the time of each sampling (the sampling timing) of the sampling signal M12A is shifted by the time Δ (shorter than the sampling cycle t) from the time of each sampling (the sampling timing) of the sampling signal M11. The time Δ is referred to also as a difference of the sampling timings or a shifted amount of the sampling timing.

The sampling signal T1 is acquired by the combination of the sampling signals M11 and M12 without the time of sampling (the sampling timing) changed. The sampling cycle of the sampling signal T1 thus can be half of the sampling cycle t, and the sampling frequency can be twice the sampling frequency of the respective sampling signals M11, M12A, and M12. In other words, the sampling signal having the double sampling frequency can be generated simulatively.

Alternatively, the sampling timing of the sampling signal M11 may be behind the sampling timing of the sampling signal M12A, instead of the case shown in FIG. 6 in which the sampling timing of the sampling signal M12A is behind the sampling timing of the sampling signal M11. The same may also be applied to the following modified examples.

The explanations are further made below while returning to FIG. 4.

The frequency characteristic calculation unit 132 calculates the frequency characteristics f11 and f12 of the respective sampling signals M11 and M12, and calculates the frequency characteristics f1 of the sampling signal T1 (S7). Since the sampling frequency of the sampling signal T1 is twice the sampling frequency of the respective sampling signals M11 and M12, the highest frequency in the frequency characteristics f1 is twice the highest frequency in the respective frequency characteristics f11 and f12. Namely, the frequency range of the frequency characteristics can be twice simulatively. This enables a detection of a malfunction of the operating robot 2 in a high frequency band higher than the sampling frequency of the sensor according to the vibrations (the acceleration) of the operating robot 2 and the reducer 22 in a high frequency band which cannot be acquired only from the single sampling signal M1.

The malfunction determination unit 133 determines whether the operating robot 2 has a malfunction in accordance with the frequency characteristics f1 (S9), namely, detects a malfunction. The malfunction determination unit 133 reads out, from the storage unit 17, the normal model generated in accordance with the frequency characteristics acquired by the same method when the operating robot 2 is in the normal state and preliminarily stored in the storage unit 17.

The normal model includes frequency characteristics U' of an average and frequency characteristics $\delta^2$ of a variance generated in accordance with the frequency characteristics of the acceleration acquired when the operating robot 2 is in the normal state.

The frequency characteristics U' of the average is acquired such that an average of acceleration is calculated in a predetermined range in the frequency characteristics of the acceleration when the operating robot 2 is in the normal state, and the calculation of the average is repeated along the axis (the horizontal axis) of the frequency in the predetermined range. Namely, the frequency which finely fluctuates with the time can be considered as a gentle change.

Alternatively, the frequency characteristics in the predetermined range may be calculated repeatedly along the axis (the horizontal axis) of the frequency in the predetermined range to integrate the frequency characteristics so as to calculate the average, in the same manner as a typical "moving average". This is the calculation method typically called a calculation of a "moving average". Different ranges adjacent to each other may overlap with each other.

The frequency characteristics $\delta^2$ of the variance is acquired such that a variance of acceleration is calculated in a predetermined range in the frequency characteristics of the acceleration when the operating robot 2 is in the normal state, and the calculation of the variance is repeated along the axis (the horizontal axis) of the frequency in the predetermined range. Alternatively, the frequency characteristics in the predetermined range may be calculated repeatedly along the axis (the horizontal axis) of the frequency in the predetermined range to integrate the frequency characteristics so as to calculate the variance, in the same manner as the typical "moving average". Different ranges adjacent to each other may overlap with each other.

In step S9, an average of acceleration is calculated in a predetermined range in the frequency characteristics f1, and the calculation of the average is repeated along the axis (the horizontal axis) of the frequency in the predetermined range so as to acquire the frequency characteristics f1' of the average, as in the case of the frequency characteristics U' of the average. Alternatively, the frequency characteristics in the predetermined range may be calculated repeatedly along the axis (the horizontal axis) of the frequency in the predetermined range to integrate the frequency characteristics so as to calculate the average as the frequency characteristics f1', in the same manner as the typical "moving average".

Next, the frequency characteristics of a square of a difference between the frequency characteristics U' and the frequency characteristics f1' are obtained. The obtained frequency characteristics are then divided by the frequency characteristics $\delta^2$ of the variance, so as to correct the obtained frequency characteristics.

Next, the values of the respective frequencies in the corrected frequency characteristics are integrated. When the integrated value is greater than the threshold of the normal model, the operating robot 2 is determined to have a malfunction (S9: YES). When the integrated value is smaller than or equal to the threshold of the normal model, the operating robot 2 is determined to be in the normal state (S9: NO).

The normal model may include the frequency characteristics such as the median, the maximum value, and the minimum value of the acceleration when the operating robot 2 is in the normal state, so as to make the determination by use of these elements in step S9.

Alternatively, time-series data of the acceleration may be modeled into an AR model, for example, to calculate a difference between the corresponding model and the model when the operating robot 2 is in the normal state, so as to compare the difference with the threshold.

Alternatively, an average or a variance of the detection values in the sampling signal T1 may be obtained to determine whether the average or the variance is included in a predetermined range so as to determine whether the operating robot 2 has a malfunction.

The measurement result output unit 134 causes the voice output unit 15 to produce an alarm sound or vibrations (S11) when the operating robot 2 is determined to have a malfunction (S9: YES).

The measurement result output unit 134 also displays the measurement result 140 on the display unit 14 (S13) when the operating robot 2 is determined to be in the normal state (S9: NO) or after the end of step S11. In particular, the sampling signals M11 and M12, the frequency characteristics f11 and f12, the frequency characteristics f1, and the determination result obtained in step S9 are displayed on the display unit 14 (S13). The measurement result output unit 134 further outputs the measurement result 140 to the communication unit 16.

The communication unit 16 sends the measurement result 140 to the computer 5 (S13). The computer 5 displays the measurement result 140. The computer 5 produces sound, voice, or vibrations when the operating robot 2 has a malfunction. The observing person or the maintenance person can confirm the determination of malfunction of the operating robot 2 through the measurement result 140 or the produced sound.

Next, the operator in the manufacturing facility 3 is determined whether to perform the operation for finishing the process on the malfunction detection device 1 (S15). The process returns to step S1 when the operation is not performed yet, and the process ends when the operation is performed.

Figure 7:
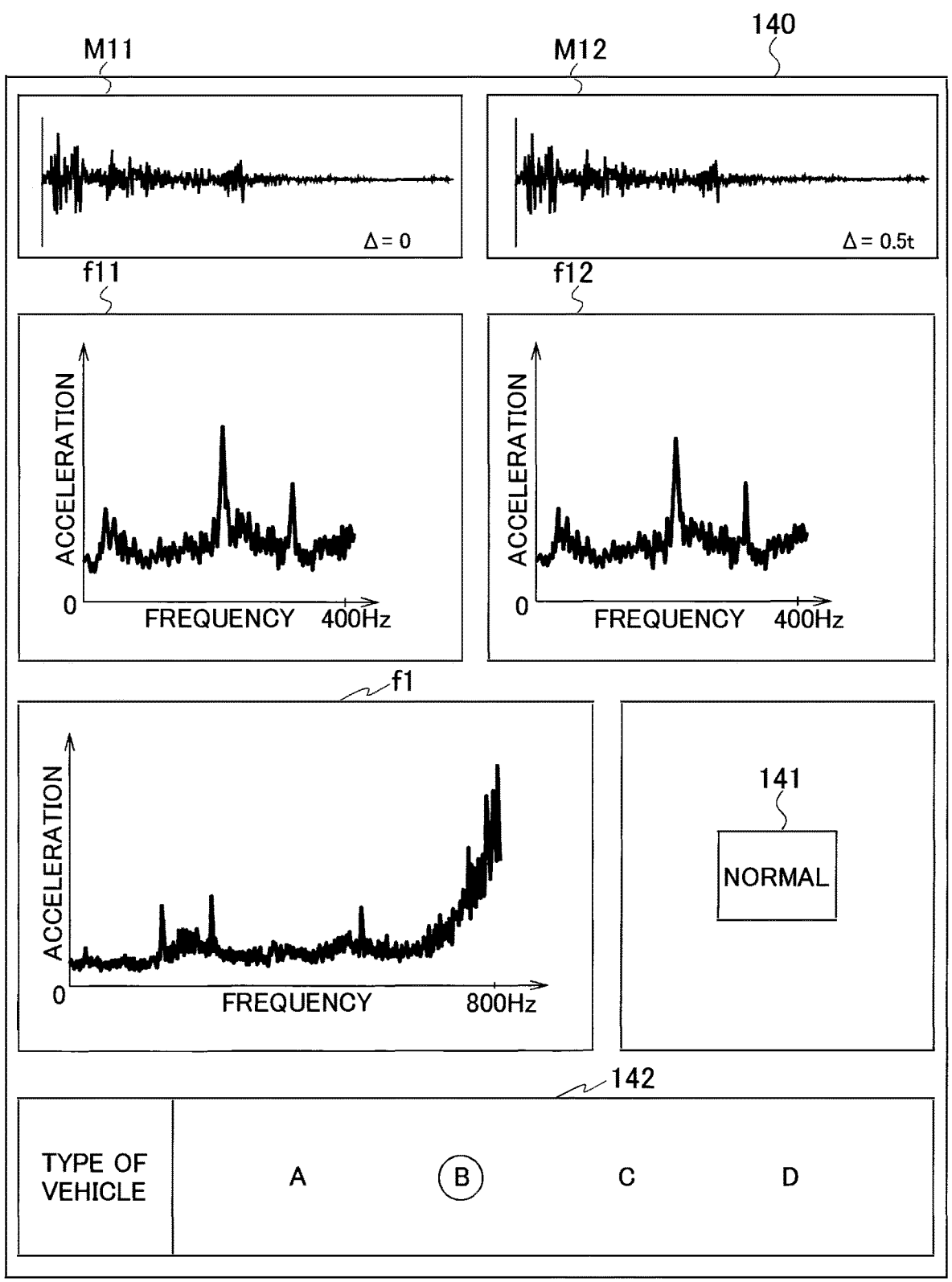
FIG. 7 is a diagram illustrating a displaying example of a measurement result 140.

FIG. 7 is a diagram illustrating a display example of the measurement result 140. The display unit 14 and the computer 5 display images as the measurement result 140 as illustrated in FIG. 7, for example.

The sampling signals M11 and M12, the frequency characteristics f11 and f12, and the frequency characteristics f1 are displayed as the measurement result 140 on the displaying region of the display unit 14 or the computer 5. FIG. 7 illustrates a plurality of detection values, which are discrete values but appear to be continuous lines, composing the respective sampling signals M11 and M12.

In addition to the sampling signal M11, the information "Δ=0" is also displayed indicating that there is no difference (shift) in the start timing. In addition to the sampling signal M12, the information "Δ=0.5 t" is also displayed indicating that the difference (Δ) of the start timing is half of the sampling cycle t.

In addition, display information 141 is also displayed indicating that the operating robot 2 is in the normal state.

When the operating robot 2 has a malfunction, information indicating that the operating robot 2 has a malfunction is displayed.

The frequency characteristics f11 and f12 indicate the characteristics of the acceleration up to 400 Hz. The frequency characteristics f1 indicate the characteristics of the acceleration up to 800 Hz which is twice 400 Hz. While FIG. 7 illustrates the respective frequency characteristics f11, f12, and f1 individually, these may be superposed while being indicated with different colors or different types of line, so as to clearly indicate the state in which the frequency of the frequency characteristics f1 is twice those of the frequency characteristics f11 and f12.

In addition, display information 142 indicating the type of vehicle manufactured by the operation of the operating robot 2 is also displayed on the display region.

The operator in the manufacturing facility 3 can recognize whether the operating robot 2 has a malfunction through the display or through the alarm sound or vibrations produced by the voice output unit 15. The observing person or the maintenance person in the remote place can also recognize whether the operating robot 2 has a malfunction through the display or through the sound produced by the computer 5.

While the above case is illustrated with the combination of the two sampling signals M11 and M12, the n-number (n is three or greater) of the sampling signals may be combined together. In such a case, two or more types of time Δ may be used so as to prevent the overlapping of the sampling timings. The sampling frequency thus can be tripled. The sampling signal T1 having a frequency which is greater than or equal to three times the sampling frequency of the sensor 23 can be generated, so as to detect a malfunction of the apparatus in the high frequency band higher than the sampling frequency of the sensor in accordance with the generated sampling signal T1.

Instead of the start time of the operation A used as the start timing of the sampling, the time in the middle of the operation A (for example, the time at which the operating contents change) may be used as the start timing. When an operation B is repeated in the operation A, the operation B may be considered as the operation A described above. Alternatively, sampling signals obtained in different operations may be combined together as necessary. In either case, the frequency characteristics in the high frequency band higher than the sampling frequency of the sensor can be obtained, so as to detect a malfunction of the operating robot 2 in the high frequency band.

As described above, the malfunction detection device 1 according to the embodiment includes the control unit (the control unit including the sensor control unit 12 and the calculation processing unit 13) including the signal input unit (the sensor control unit 12) to which the sampling signal obtained when the state of the apparatus (2) detected by the sensor 23 is sampled is input so as to detect a malfunction of the apparatus in accordance with the sampling signal. The sensor control unit 12 in the control unit causes the sensor 23 to start the sampling at the different start timings (t11 and t12). The calculation processing unit 13 in the control unit combines the sampling signals M11 and M12 (M12A) obtained by the start of the sampling at the start timings and output, and detects a malfunction of the apparatus in accordance with the combined sampling signal T1 (S9).

The frequency of the combined sampling signal T1 thus can be higher than the sampling frequency of the sensor 23, namely, the sampling signal obtained by the sensor with the higher sampling frequency can be generated simulatively, so as to detect a malfunction of the apparatus in the high frequency band higher than the sampling frequency of the sensor 23. The above malfunction detection method performed by the malfunction detection device 1 can similarly detect a malfunction of the apparatus in the high frequency band higher than the sampling frequency of the sensor.

While a sensor with a high sampling frequency is typically expensive, the malfunction detection device 1 can detect a malfunction of the apparatus in the high frequency band at a low cost without the use of such an expensive sensor.

Since the sampling is started at the different start timings (t11 and t12), the sampling signal T1 having a high frequency can be obtained by the single sensor 23, and a malfunction of the apparatus in the high frequency band higher than the sampling frequency of the sensor can be detected in accordance with the obtained sampling signal T1. Namely, a malfunction of the apparatus in the high frequency band higher than the sampling frequency of the sensor can be detected with the single sensor 23 effectively as compared with a case of combining sampling signals output from a plurality of sensors 23.

The calculation processing unit 13 in the control unit calculates the frequency characteristics f1 of the combined sampling signal T1 (S7), and determines whether the apparatus has a malfunction according to the calculated frequency characteristics f1 (S9), so as to determine whether the apparatus has a malfunction in accordance with the frequency characteristics in the high frequency band higher than the sampling frequency of the sensor, enabling the detection of a malfunction of the apparatus in the high frequency band higher than the sampling frequency of the sensor.

The calculation processing unit 13 or the communication unit 16 in the control unit displays the frequency characteristics f1 on the display unit 14 or the computer 5 (S13), so as to visually recognize the state of the apparatus in the high frequency band higher than the sampling frequency of the sensor 23. Since the frequency characteristics f11 and f12 are also displayed, the person involved such as the observing person or the maintenance person can confirm the state of the apparatus (2) more accurately.

Since the sampling signal is obtained by sampling the state of vibrations of the apparatus, a malfunction of the apparatus causing vibrations can be detected in the high frequency band higher than the sampling frequency of the sensor.

Since the apparatus (2) is a multi-axis machine including the rotating mechanism (21), a malfunction of the multi-axis machine can be detected in the high frequency band higher than the sampling frequency of the sensor.

The sampling cycles of the sampling started at the different start timings (t11 and t12) are common to each other. This prevents the time (the sampling timing) of the detection value P1 included in the sampling signal M11 and the time (the sampling timing) of the detection value P2 included in the sampling signal M12A shown in FIG. 6 from overlapping with each other. The frequency of the combined sampling signal T1 can be higher than the sampling frequency of the sensor 23. A malfunction of the apparatus causing vibrations thus can be detected in the high frequency band higher than the sampling frequency of the sensor in accordance with the sampling signal T1.

The sampling cycles are not necessarily common to each other, and the respective sampling cycles of the sampling signals before being combined may be different to each other. The prevention of overlapping of the sampling timings can obtain the combined sampling signal T1 with a high frequency regardless of whether the sampling cycles are different from each other, so as to detect a malfunction of the apparatus in the high frequency band higher than the sampling frequency of the sensor.

MODIFIED EXAMPLES

Modified examples are described below. The elements different from those in the above embodiment are mainly described below, and overlapping explanations of the same or similar contents are not repeated below.

First Modified Example

Figure 8:
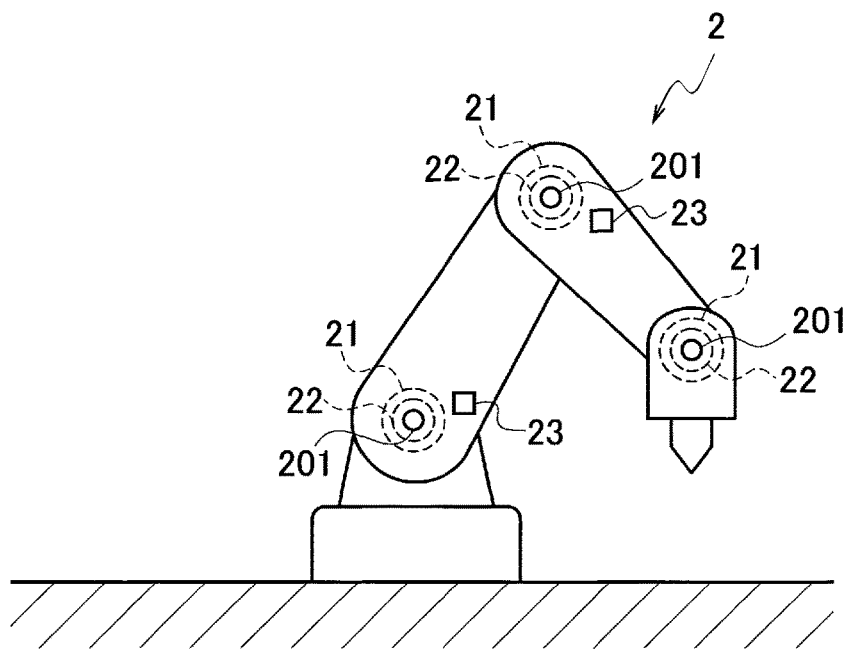
FIG. 8 is a diagram illustrating an arrangement example of a sensor 23 according to a first modified example.

FIG. 8 is a diagram illustrating an arrangement example of the sensor 23 according to a first modified example.

The first modified example uses the plural sensors 23. For example, the two sensors 23 are provided in the single operating robot 2, in which one of the sensors 23 is arranged adjacent to the reducer 22 provided in one of the rotating shafts 201, and the other sensor 23 is arranged adjacent to the reducer 22 provided in another one of the rotating shafts 201. The respective sensors 23 may be arranged adjacent to the reducer 22 provided in the same rotating shaft 201.

The sensor control unit 12 sends the sampling start signal 200 to the one sensor 23 at the reception time t0 of receiving the operation start signal 100 when executing one operation A. The sensor control unit 12 receives the sampling signal M1 from the sensor 23, and transfers the sampling signal M1 as the sampling signal M11 to the calculation processing unit 13. During this operation A, only the motor 21 corresponding to the one sensor 23 may operate, or the respective motors 21 corresponding to both of the sensors 23 may operate.

The sensor control unit 12 sends the sampling start signal 200 to the other sensor 23 after the time Δ has passed since the time of sending the sampling start signal 200 to the one sensor 23 (since the reception time t0 of the operation start signal 100). The sensor control unit 12 receives the sampling signal M1 from the sensor 23, and transfers the sampling signal M1 as the sampling signal M12A to the calculation processing unit 13.

The processing by the calculation processing unit 13 is the same as that described in the above embodiment, while the step S4 is not necessary in this example.

In the first modified example, since the first sensor 23 which outputs the sampling signal M11 and the second sensor 23 which outputs the sampling signal M12 (M12A) are used, both the sampling signal M11 and the sampling signal M12A can be obtained during each operation A of the same operation type, namely, at the same timing. In other words, since the operation type of these sampling signals is the same, there is no need to perform the step of confirming the operation type described in step S4 in the above embodiment. In addition, the sampling signals can be combined immediately after each operation, so as to detect a malfunction of the apparatus in accordance with the combined sampling signal. This example can deal with the problem with the consideration of the respective sampling timings due to the use of the plural sensors.

A difference (the time Δ) of the sampling timings between the sampling signal M11 and the sampling signal M12A is shorter than the sampling cycle t of these sampling signals. The difference (the time Δ) is shorter than the sampling cycle of the sampling signal M11, and is shorter than the sampling cycle of the sampling signal M12A. The sampling timings of the respective signals can be prevented from overlapping with each other, so as to lead the frequency of the combined sampling signal T1 to be higher than the sampling frequency of the sensor 23 with a high accuracy. A malfunction of the apparatus in the high frequency band higher than the sampling frequency of the sensor thus can be detected in accordance with the sampling signal T1.

According to the first modified example, when the period of time when one of the rotating shafts 201 is operating does not overlap with the period of time when another one of the rotating shafts 201 is operating, a malfunction of the one rotating shaft 201 in the high frequency band can be detected during the operating time of the one rotating shaft 201, and a malfunction of the other rotating shaft 201 in the high frequency band can be detected during the operating time of the other rotating shaft 201. Namely, a malfunction of the respective rotating shafts 201 in the high frequency band can be detected depending on the operating state of the respective rotating shafts 201 when the sensors 23 are arranged adjacent to the different rotating shafts 201 in the same operating robot 2.

Second Modified Example

Figure 9:
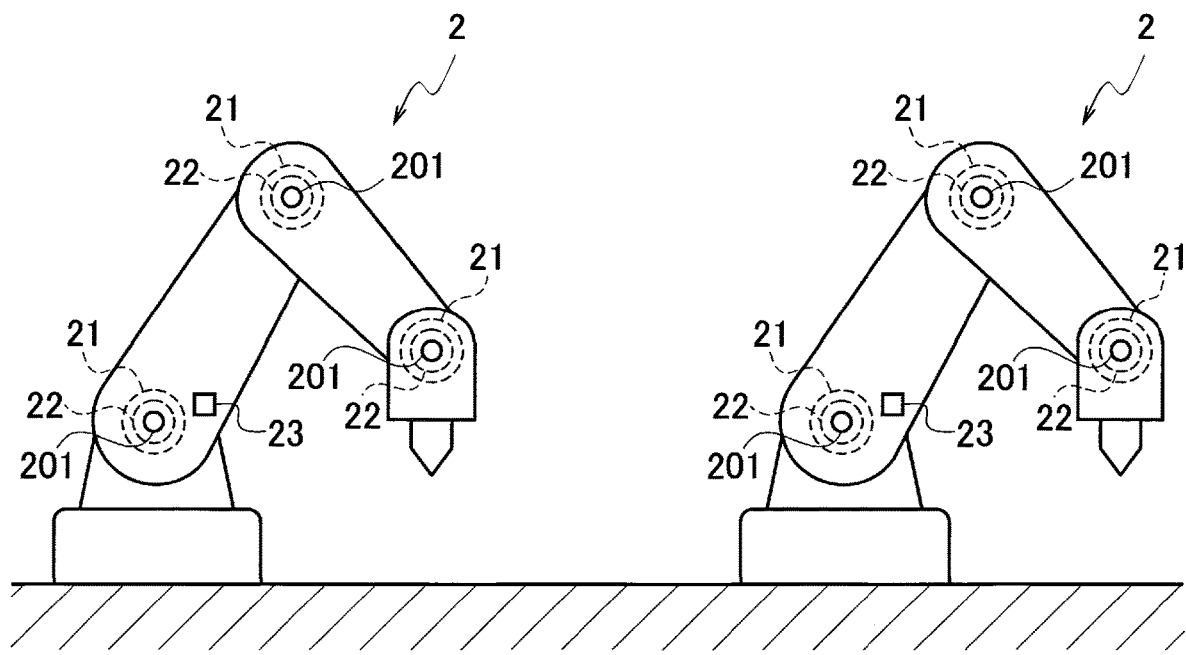
FIG. 9 is a diagram illustrating an arrangement example of a sensor 23 according to a second modified example.

FIG. 9 is a diagram illustrating an arrangement example of the sensor 23 according to a second modified example.

The second modified example also uses the plural sensors 23. For example, the two operating robots 2 are used, and the operating robots 2 are each provided with the sensor 23, as in the case of the above embodiment. The position of the sensor 23 may be changed in the respective operating robots 2.

The sensor control unit 12 sends the sampling start signal 200 to the one sensor 23 at the reception time t0 of receiving the operation start signal 100 when both of the operating robots 2 are operating during one operation A. The sensor control unit 12 receives the sampling signal M1 from the sensor 23, and transfers the sampling signal M1 as the sampling signal M11 to the calculation processing unit 13.

The sensor control unit 12 sends the sampling start signal 200 to the other sensor 23 after the time Δ has passed since the reception time t0 of the operation start signal 100 when the same operation A is executed. The sensor control unit 12 receives the sampling signal M1 from the sensor 23, and transfers the sampling signal M1 as the sampling signal M12A to the calculation processing unit 13.

The processing by the calculation processing unit 13 is the same as that described in the above embodiment, while the step S4 is not necessary in this example.

In the second modified example, since the first sensor 23 which outputs the sampling signal M11 and the second sensor 23 which outputs the sampling signal M12 (M12A) are used, both the sampling signal M11 and the sampling signal M12A can be obtained during each operation A of the same operation type, namely, at the same timing. In other words, since the operation type of these sampling signals is the same, there is no need to perform the step of confirming the operation type described in step S4 in the above embodiment. In addition, the sampling signals can be combined immediately after each operation, so as to detect a malfunction of the apparatus in accordance with the combined sampling signal. This example can also deal with the problem with the consideration of the respective sampling timings due to the use of the plural sensors.

A difference (the time Δ) of the sampling timings between the sampling signal M11 and the sampling signal M12A is shorter than the sampling cycle t of these sampling signals. The difference (the time Δ) is shorter than the sampling cycle of the sampling signal M11, and is shorter than the sampling cycle of the sampling signal M12A. The sampling timings of the respective signals can be prevented from overlapping with each other, so as to lead the frequency of the combined sampling signal T1 to be higher than the sampling frequency of the respective sensors 23 with a high accuracy. A malfunction of the apparatus in the high frequency band higher than the sampling frequency of the respective sensors thus can be detected in accordance with the sampling signal T1.

According to the second modified example, since the plural operating robots 2 are each provided with the sensor 23, a malfunction of the apparatus in the high frequency band higher than the sampling frequency of the sensor can be detected while considering the respective operating robots 2 collectively as the single apparatus.

When one of the two operating robots 2 is operating, the determination of a malfunction may be made for the corresponding operating robot 2 in the same manner as the above embodiment.

According to the first modified example and the second modified example, the n-number (n is three or greater) of the sampling signals may be combined together, as in the case of the above embodiment. In such a case, three or more operating robots 2 may each be provided with the sensor 23. This case only needs to prevent the overlapping of the sampling timings. The sampling frequency thus can be tripled. The sampling signal T1 having a frequency which is greater than or equal to three times the sampling frequency of the sensor 23 can be generated, so as to detect a malfunction of the apparatus in the high frequency band higher than the sampling frequency of the sensor in accordance with the generated sampling signal T1.

In particular, any two of the three or more start timings are only required to fulfill the following condition. The time difference T between the two start timings fulfills the condition of $T=n \times t+a$, where t is the sampling cycle of the sensor 23, n is zero or a positive integer, and $0<a<t$. This can prevent the sampling timings from overlapping with each other, so as to detect a malfunction of the apparatus in the high frequency band higher than the sampling frequency of the sensor.

Instead of the start time of the operation A used as the start timing, the time in the middle of the operation A (for example, the time at which the operating contents change) may be used as the start timing. When an operation B is repeated in the operation A, the operation B may be considered as the operation A described above. Alternatively, sampling signals obtained in different operations may be combined together as necessary.

According to the first modified example and the second modified example described above, the calculation processing unit 13 in the control unit combines the first sampling signal M11 obtained when the state of the apparatus detected by the first sensor 23 is sampled with the second sampling signal M12 (M12A) obtained when the state of the apparatus detected by the second sensor 23 is sampled, so as to detect a malfunction of the apparatus in accordance with the combined sampling signal.

The above configuration thus does not need to convert the sampling signal M12 to the sampling signal M12A so as to directly obtain the combined sampling signal with a higher frequency than the sampling frequency of the sensor 23. In addition, the sampling signals can be combined immediately after each operation. The combined sampling signal can be obtained without the confirmation of the operation type. This enables the detection of a malfunction of the apparatus in the high frequency band higher than the sampling frequency of the sensor in accordance with the obtained sampling signal. When the plural vibration sensors are used, the sampling signals can be combined in view of the sampling timing of the respective vibration sensors, so as to detect a malfunction of the apparatus in the high frequency band higher than the sampling frequency of the respective sensors in accordance with the obtained sampling signal.

According to the first modified example, since the first sensor 23 and the second sensor 23 are arranged at different positions in the same apparatus (2), the area of the apparatus provided with the sensors 23 can be expanded so as to detect a malfunction of the apparatus in the high frequency band higher than the frequency of the respective sensors in accordance with the condition in the wide area.

According to the second modified example, since the first sensor 23 and the second sensor 23 are separately provided in the respective apparatuses (2), a malfunction of the apparatuses, which are collectively considered as the single detection target, in the high frequency band higher than the sampling frequency of the respective sensors in the detection target can be detected.

The time difference T between the two start timings fulfills the condition of $T=n \times t+a$, where t is the sampling cycle, n is zero or a positive integer, and $0<a<t$. This can prevent the sampling timings from overlapping with each other, so as to detect a malfunction of the apparatus in the high frequency band higher than the sampling frequency of the sensor.

The sensor control unit 12 preferably can set the sampling cycle and the start timing of the sampling for each of the respective sensors 23 used in the modified examples. This can enhance the reliability of the combined sampling signal, so as to detect a malfunction of the apparatus in the high frequency band higher than the sampling frequency of the sensor in accordance with the combined sampling signal with a high reliability.

As described in the first modified example, the arrangement of the sensors 23 adjacent to the different rotating shafts 201 of the multi-axis machine (2) can obtain the combined sampling signal with a high reliability, so as to detect a malfunction of the apparatus in the high frequency band higher than the sampling frequency of the respective sensors in accordance with the obtained sampling signal.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, the sensor may sample a current or a voltage in the apparatus, instead of the sampling of the state of vibrations of the apparatus. The apparatus as a determination target regarding a malfunction and the type of the malfunction is not limited to the operating robot 2. An engine of a vehicle instead of the motor or a transmission instead of the reducer may be applicable as a target, for example. Any of apparatuses having a rotating mechanism and a transmission mechanism, such as a rotating apparatus of a moving object, a moving object such as playground equipment in an amusement park, and a work machine such as a three-dimensional printer, may be a target to be determined. Any other types of apparatus may also be a target to be determined.

The malfunction detection device 1 may be installed in a remote place, as in the case of the computer 5, to receive/send necessary signals or data via a communication line so as to detect a malfunction of an apparatus. The single malfunction detection device 1 may detect a malfunction of a plurality of apparatuses. The plural apparatuses may be installed in different places. The functional block including the motor control unit 11, the sensor control unit 12, and the calculation processing unit 13, for example, may be implemented by a computer.

The malfunction detection by the malfunction detection device 1 may also be applied to a prediction or an estimation of a breakdown. For example, when the time from a cause of a malfunction to a breakdown is already known, the detection of the malfunction can be the prediction or the estimation of the breakdown.

The respective functions described in the above embodiment can be implemented in single or plural processing circuits. The respective processing circuits include a programmed processing device, such as a processing device including an electric circuit. The processing device includes an application-specific integrated circuit (ASIC) configured to execute the functions described in the above embodiment or conventional circuit components.

REFERENCE SIGNS LIST

1 MALFUNCTION DETECTION DEVICE
2 OPERATING ROBOT (APPARATUS)
11 MOTOR CONTROL UNIT
12 SENSOR CONTROL UNIT (PART OF CONTROL UNIT)
13 CALCULATION PROCESSING UNIT (PART OF CONTROL UNIT)
14 DISPLAY UNIT
15 VOICE OUTPUT UNIT
21 MOTOR
22 REDUCER
23 SENSOR
100 OPERATION START SIGNAL
131 SIGNAL COMBINATION UNIT
132 FREQUENCY CHARACTERISTIC CALCULATION UNIT
133 MALFUNCTION DETERMINATION UNIT
134 MEASUREMENT RESULT OUTPUT UNIT
140 MEASUREMENT RESULT
200 SAMPLING START SIGNAL
201 ROTATING SHAFT
A, B OPERATION
P1, P2 DETECTION VALUE
t SAMPLING CYCLE
f11, f12, f1 FREQUENCY CHARACTERISTICS
M1, M11, M12, M12A SAMPLING SIGNAL BEFORE COMBINATION
t11, t12 RECEPTION TIME
T1 COMBINED SAMPLING SIGNAL
W WAVEFORM
Δ TIME (DIFFERENCE)

The invention claimed is:

1. A malfunction detection device comprising a control unit including a signal input unit configure to obtain a sampling signal which is a state of an apparatus detected and sampled by a sensor, so that the control unit detects a malfunction of the apparatus in accordance with the sampling signal, the control unit being configured to:
cause the sensor to start sampling at a plurality of start timings different from each other;
combine sampling signals obtained by the start of the sampling at the different start timings; and
detect the malfunction of the apparatus in accordance with the combined sampling signal.

2. The malfunction detection device according to claim 1, wherein the control unit combines a first sampling signal of the sampling signals obtained when the state of the apparatus detected by a first sensor is sampled and a second sampling signal of the sampling signals obtained when the state of the apparatus detected by a second sensor is sampled, and detects the malfunction of the apparatus in accordance with the combined sampling signal.

3. The malfunction detection device according to claim 2, wherein the first sensor and the second sensor are arranged at different positions in the same apparatus.

4. The malfunction detection device according to claim 2, wherein the first sensor and the second sensor are provided in different apparatuses.

5. The malfunction detection device according to claim 2, wherein a difference between a sampling timing of the first sampling signal and a sampling timing of the second sampling signal is shorter than a sampling cycle of the first sampling signal and shorter than a sampling cycle of the second sampling signal.

6. The malfunction detection device according to claim 1, wherein sampling cycles of the sampling started at the different start timings are common to each other.

7. The malfunction detection device according to claim 6, wherein a time difference between two of the start timings fulfills a condition of $T=n \times t+a$, where t is each sampling cycle, n is zero or a positive integer, and $0<a<t$.

8. The malfunction detection device according to claim 1, wherein the control unit calculates frequency characteristics of the combined sampling signal, and detects the malfunction of the apparatus in accordance with the calculated frequency characteristics.

9. The malfunction detection device according to claim 8, wherein the control unit makes the frequency characteristics to be displayed.

10. The malfunction detection device according to claim 1, wherein the sampling signals are each a sampling signal obtained when a state of vibrations of the apparatus is sampled.

11. The malfunction detection device according to claim 1, wherein the apparatus is a multi-axis machine including a rotating mechanism.

12. A malfunction detection method of a malfunction detection device comprising a control unit including a signal input unit configure to obtain a sampling signal which is a state of an apparatus detected and sampled by a sensor, so that the control unit detects a malfunction of the apparatus in accordance with the sampling signal, the method comprising:
causing the sensor to start sampling at a plurality of start timings different from each other;
combining sampling signals obtained by the start of the sampling at the different start timings; and
detecting the malfunction of the apparatus in accordance with the combined sampling signal.

* * * * *